Oct. 7, 1958
C. H. HOLMES
2,855,242
PORTABLE VISOR HAVING MAGNETIC MEANS
FOR ATTACHMENT TO A VEHICLE
Filed Nov. 30, 1956
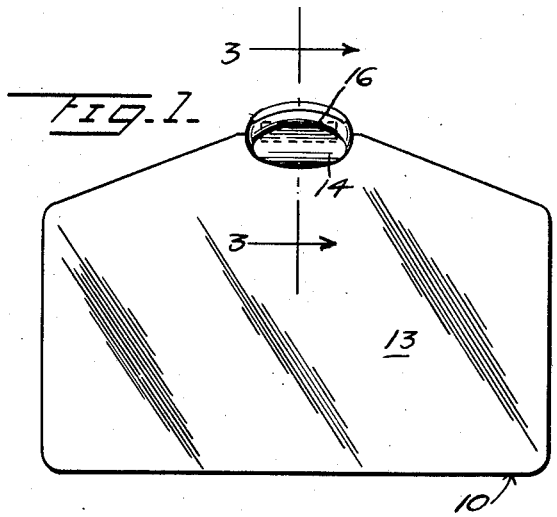
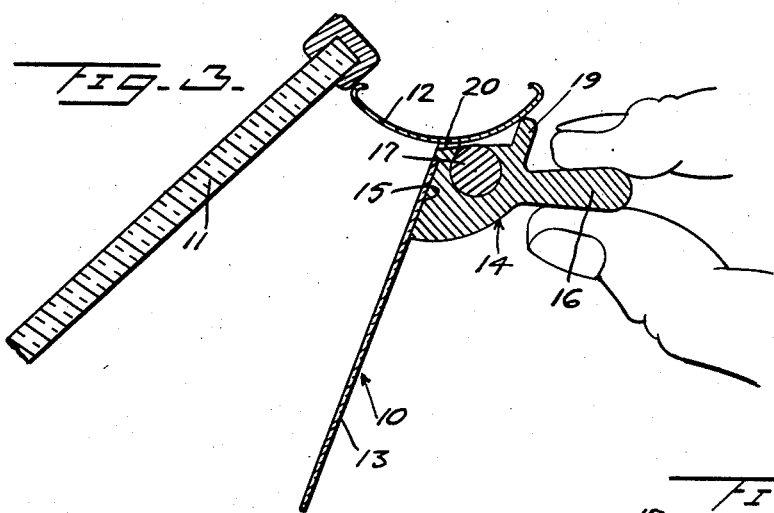
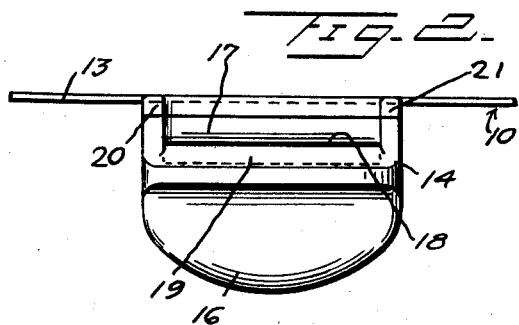
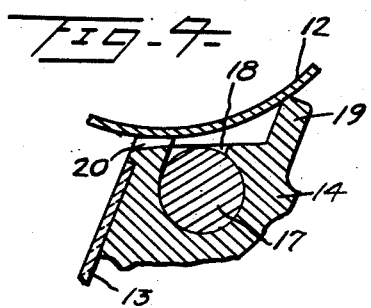
INVENTOR
C. H. Holmes
BY Kimmel & Crowell
ATTORNEYS

United States Patent Office 2,855,242
Patented Oct. 7, 1958

2,855,242
PORTABLE VISOR HAVING MAGNETIC MEANS FOR ATTACHMENT TO A VEHICLE

Charles H. Holmes, Fort Wayne, Ind.

Application November 30, 1956, Serial No. 625,438

3 Claims. (Cl. 296—97)

The present invention relates to portable visors, and more particularly to visors which can be attached to the metallic rim of windshields and windows and moved from place to place as the occasion demands.

The present invention has for its principal object the provision of a magnetic bracket for securing the visor to any metallic base.

Another object of the invention is to provide a support bracket for windshield visors which is inexpensive to manufacture, simple to use, and which will effectively support the visor in position on the windshield without resorting to other means.

Other objects and advantages will become apparent in the following specification when considered in the light of the atatched drawings, in which:

Figure 1 is a front elevation of the invention.

Figure 2 is a fragmentary top plan view of the invention.

Figure 3 is an enlarged fragmentary vertical cross-section taken along the line 3—3 of Figure 1, looking in the direction of the arrows.

Figure 4 is a view similar to Figure 3, showing an enlarged detail thereof.

Referring now to the drawings in detail wherein like reference characters indicate like parts throughout the several figures, the reference numeral 10 indicates generally a visor constructed in accordance with the invention.

The visor 10 is intended for use with a windshield, a portion of which is illustrated at 11, and is particularly adapted for attachment to the inner trim molding 12 of the windshield which normally completely encircles the inside of the glass. The visor 10 includes a flexible transparent panel 13 which may be formed of colored plastic of any desired shade.

A bracket, generally indicated at 14, is provided with a flat surface 15 to which the panel 13 is secured by adhesive or any other suitable means. The bracket 14 is provided with an arcuate handle portion 16 extending oppositely of the flat surface 15 to permit the visor 10 to be moved from place to place.

A magnet 17 is provided with a rod-like configuration and embedded in the body of the bracket 14 between the flat surface 15 and the handle 16. The bracket 14 is slotted as at 18 overlying the magnet 17 so that the magnetic forces from the magnet 17 are in no way obstructed.

The bracket 14 is provided with an upstanding flange 19 between the magnet 17 and the handle 16 to form a point of engagement of the bracket 14 with the molding 12. A pair of upstanding bosses 20 and 21 are formed on the opposite edges of the bracket 14 on the side of the magnet 17 opposite the flange 19 and in general alignment with the flat surface 15. The bosses 20 are adapted to engage the molding 12 to form additional points of suspension for the bracket 14 so that the magnet 17 is prevented from coming in direct contact with the molding 12 while being spaced slightly therefrom.

In the use and operation of the invention, by grasping the handle 16, the visor 10 can be moved to any desired position around the windshield with the panel 13 overlying the windshield to block the rays of the sun from the eyes of the user. When there is no necessity for the panel 13 to be arranged parallel to the windshield, the bracket 14 can be reversed with the panel 13 parallel to the ceiling of the car completely out of the way of the driver and passengers.

Having thus described the preferred embodiment of the invention, it should be understood that numerous structural modifications and adaptations may be resorted to without departing from the scope of the appended claims.

What is claimed is:

1. A portable visor comprising a flexible transparent tinted panel, a bracket having a flat surface to which said panel is secured, a handle integrally formed on said bracket extending from the side thereof opposite said panel, said bracket having a substantially flat surface extending at an angle to said first named flat surface toward said handle, a pair of spaced apart bosses integrally formed on said second named flat surface adjacent said first named flat surface, an integral flange formed on said second named flat surface adjacent said handle parallel to said bosses and parallel to said first named flat surface, and a magnet embedded in said bracket in substantially parallel relation to each of said flat surfaces, said bracket having an aperture through said second named flat surface overlying said magnet exposing said magnet therethrough.

2. A portable visor comprising a flexible transparent tinted panel, a bracket having a flat surface to which said panel is secured, a handle integrally formed on said bracket extending from the side thereof opposite said panel, said bracket having a substantially flat surface extending at an angle to said first named flat surface toward said handle, an integral flange formed on said second named flat surface adjacent said handle parallel to said first named flat surface, means on said bracket adjacent an edge of said second named flat surface spaced from said flange for engaging a support on which the bracket is adapted to be mounted to space said second named flat surface therefrom in cooperation with said flange, and a magnet embedded in said bracket in substantially parallel relation to each of said flat surfaces, said bracket having an aperture through said second named flat surface overlying said magnet exposing said magnet therethrough.

3. In a portable visor having magnetic means for attachment to a window frame of a vehicle, a visor panel, and a bracket to which said panel is secured, said bracket having a pair of flat surfaces disposed at an angle to each other, an integrally formed handle, a pocket for said magnet in which said magnet is carried, and an integral flange spaced from and extending above said pocket rearwardly thereof with respect to said visor panel, said visor panel secured with and flat against one of said flat surfaces, and boss forming means adjacent an edge of said other flat surface spaced from said flange cooperating with the latter to engage against said window frame, said pocket having an opening through which said magnet is partially exposed.

References Cited in the file of this patent

UNITED STATES PATENTS

| 2,603,530 | Jones | July 15, 1952 |
| 2,613,104 | Parsons | Oct. 7, 1952 |
| 2,701,158 | Schmitt | Feb. 1, 1955 |